3,026,329
MONO- AND DI-CHLOROBORANE ETHERATES

Herbert C. Brown, Lafayette, Ind., Bookinkeve Channakeshavaiah Subba Rao, Mysore City, India, and Paul A. Tierney, Pittsburgh, Pa., assignors to Purdue Research Foundation, Lafayette, Ind., a corporation of Indiana
No Drawing. Filed July 11, 1957, Ser. No. 671,121
25 Claims. (Cl. 260—345.1)

This invention relates to chloroborane etherates, to processes for their production, and to their uses.

It is among the objects of the invention to provide, as new compounds, stable but reactive complexes of chloroboranes ($BH_2Cl$; $BHCl_2$) and ethers ($R_2O$) which have the empirical formulas $ClH_2B:OR_2$ and $Cl_2HB:OR_2$ together with simple and efficient processes of preparing them.

A further object is to provide an improved method of selectively hydrogenating certain classes of organic compounds with the aforesaid etherates.

Yet another object is to provide a method of producing organo compounds of boron by reaction of the said chloroborane etherates and unsaturated hydrocarbons.

Still other objects will appear from the following specification.

The invention is predicated in part upon our discovery that chloroborane etherates of the formulas $ClH_2B:OR_2$ and $Cl_2HB:OR_2$ may be produced easily by reaction of appropriate proportions of boron trichloride ($BCl_3$) and a solution of a metallic borohydride ($MBH_4$) or diborane ($B_2H_6$) in an ether ($R_2O$). For instance, the monochloro compound may be made from a metallic borohydride or from diborane in solution in an ether in accordance with the following reactions:

$$MBH_4 + BCl_3 + 2R_2O \rightarrow MCl + 2ClH_2B:OR_2$$

where M is a metal and $R_2O$ is an ether; and $$B_2H_6 + BCl_3 + 3R_2O \rightarrow 3ClH_2B:OR_2$$

Similarly, the dichloroborane etherates may be produced according to the following equations:

$$MBH_4 + 3BCl_3 + 4R_2O \rightarrow MCl + 4Cl_2HB:OR_2$$

and $$B_2H_6 + 4BCl_3 + 6R_2O \rightarrow 6Cl_2HB:OR_2$$

In the practice of the invention, the diborane or the metallic borohydride may be dissolved in an appropriate ether and gaseous boron trichloride passed into the solution in an amount, according to the foregoing equations, appropriated to form the desired chloroborane, which complexes with the solvent ether. Or, in the case of diborane the boron trichloride may be dissolved in an ether and the diborane passed into the solution, the proportions being such as to produce the particular etherate desired. In exemplification of this factor of the invention, diethyl ether may be used to dissolve lithium borohydride ($LiBH_4$) or diborane. Other simple ethers of the empirical formula $R_2O$ in which R is an alkyl radical such as methyl, propyl or butyl, or mixed simple ethers of the formula $RR'O$ may be used as solvents. Likewise, there may be used such cyclic ethers as tetrahydrofuran (tetramethylene oxide) or tetrahydropyran (pentamethylene oxide). Particularly advantageous are the dialkyl ethers of the ethylene glycols of the empirical formula $RO(C_2H_4O)_nR$ in which R is a lower alkyl radical, such as methyl, ethyl, propyl and butyl, and $n$ is one or larger whole number. Thus diglyme (dimethyl ether of diethylene glycol) is an especially satisfactory solvent for sodium borohydride ($NaBH_4$) as well as for diborane. As far as we are aware, any ether that is a solvent for the borohydride used or for diborane is operable in the practice of the invention.

In general, these reactions proceed satisfactorily at room temperature. If they tend to be unduly vigorous they can be controlled by the use of cooling means. Temperatures above ambient may be used provided they are not so high as to cause undesired decomposition of the etherate. In other words, the reaction temperature will depend upon the particular chloroborane to be produced and the ether used, i.e., the reaction velocity of the system. Too, an excess of the ether may be used if desirable for any reason, any excess after reaction being removed, if pure etherate is wanted, as by vacuum distillation.

Of the metallic borohydrides, we now prefer sodium borohydride because it is less expensive than other borohydrides and is readily available. However, satisfactory results are to be had with others, such as lithium borohydride.

The following examples are illustrative of the practice of the invention:

Example 1

MONOCHLOROBORANE TETRAHYDROFURANATE 250 ml. of freshly distilled tetrahydrofuran was placed in a dry 500 ml. round bottom flask provided with a sintered glass gas dispersion tube and exit leading to a mercury bubbler. The flask was flushed with dry nitrogen and then hooked to an all glass diborane generation apparatus. 0.5 M diborane was passed into the tetrahydrofuran solution (where it was retained). The diborane generator was then removed and the flask was connected to a $BCl_3$ cylinder. 0.5 mole of $BCl_3$ was slowly passed into the solution, when an exothermic reaction took place to form the $H_2BCl$ etherate in solution. This etherate had a melting point of $-36°$ to $-38°$ C.

The same reaction has been carried out also in diglyme and other ethers.

Example 2

MONOCHLOROBORANE ETHERATE

A 1.0 M solution of sodium borohydride was prepared by dissolving 0.25 mole $NaBH_4$ in 250 ml. diglyme in a dry 500 ml. round bottom flask provided with a magnetic stirrer, a nitrogen inlet and an outlet. A 3.0 M solution of $BCl_3$ in ethyl ether was prepared by passing the calculated amount of $BCl_3$ gas into anhydrous ether in a closed system. 0.25 mole $BCl_3$ (83 ml., 3.0 M ether solution) was added with stirring, from a separatory funnel, in a nitrogen atmosphere. As the reactants were added, the system was cooled in water to prevent warming up. NaCl was precipitated and $H_2BCl$ etherate was left in solution.

It is believed that in this instance the chloroborane complexed with both the ethyl ether and also the diglyme. Such mixed etherates may be desirable for some purposes. For instance, $BCl_3$ is stable in ethyl ether whereas it splits diglyme. On the other hand, $NaBH_4$ is only slightly soluble in ethyl ether while it is highly soluble in diglyme. By adding $BCl_3$ in ethyl ether to $NaBH_4$ the advantages of both solvents are achieved and splitting of diglyme is suppressed. The same advantages are attained with mixed etherates of $BHCl_2$ and $BH_2Cl$, which exhibit the same activity as the pure compounds.

Example 3

MONOCHLOROBORANE ETHYL ETHERATE

Into a reaction flask was condensed 22.4 cc. (1 mmole) of diborane, 22.4 cc. (1 mmole) of boron trichloride and 67.2 cc. (3 mmoles) of ethyl ether. The flask was allowed to warm at room temperature. After 40 hours the pressure in the flask was 14 mm. The volatile gases were removed with the flask submerged in a minus 78° bath. The residue in the flask melted at minus (85–

105°). The compound decomposed rapidly in air as did the corresponding dichloroborane ethyl etherate.

Example 4
MONOCHLOROBORANE METHYL ETHERATE

Dimethyl ether, 44.4 cc. (2 mmoles) was condensed into a break-tip ampule of 4 cc. volume. This was attached to the vacuum line by means of a standard taper joint. To this were added 15 cc. (0.67 mmole) of boron trichloride and 30 cc. (1.34 mmoles) of diborane. The ampule was sealed under vacuum and allowed to stand at room temperature for 36 hours. After this time the tube was attached to the vacuum line and the volatile gases were removed at minus 78°. There was collected 15 cc. (0.67 mmole) of diborane (vapor pressure at $-111.9°$, 196 mm.). The melting point of the etherate remaining in the tube was minus (20–21°).

Example 5
DICHLOROBORANE TETRAHYDROPYRANATE

The procedure was the same as that used for the monochloroborane compound. Six cc. (0.270 mmole) of boron trichloride, 1.5 cc. (0.093 mmole) of diborane, and 12.5 cc. (0.555 mmole) of tetrahydropyran were used. The melting point of the etherate product was 10–15°.

Example 6
DICHLOROBORANE ETHYL ETHERATE

Into a reaction flask on the vacuum line was condensed 15 cc. (0.67 mmole) of boron trichloride. To this was added 38.6 cc. (1.72 mmoles) of ethyl ether. Then 3.8 cc. (0.17 mmole) of diborane was added to the flask and the mixture was allowed to warm to room temperature. After one hour the flask was submerged in a minus 78° bath and the excess ethyl ether was recovered. There was obtained 15.9 cc. (0.71 mmole). The material remaining in the flask was frozen and the melting point was minus (25–30°). The compound decomposed rapidly in air with the evolution of a gas.

These etherates of chloroborane are relatively stable liquids that may, in general, be handled readily, and that are easily prepared as evidenced by the foregoing examples. They are excellent selective hydrogenating agents that may be used as substitutes for diborane and other hydrogenating agents for such purposes. This is desirable inasmuch as diborane is a gas that is difficult to handle or ship safely, and the ether complexes of which tend to dissociate at room temperature. In the absence of the ether component diborane does not react with $BCl_3$ at any significant rate. Moreover, the reaction product, $B_2H_5Cl$, is an unstable gas which offers no advantage over $B_2H_6$ itself. Not only do these etherates of the chloroboranes offer great advantage in ease of handling but also they exhibit the marked selectivity of diborane as a hydrogenating agent toward some functional groups together with its inertness to other functional groups. For these purposes we prefer the monochloroborane etherates because their content of active hydrogen is higher than that of the dichloroborane etherates and they exhibit decreased tendencies to split ethers.

These chloroborane etherates are much more stable than the boron trichloride etherates. Consequently they also make possible the introduction of $BCl_3$ in a particularly stable form. For this purpose the dichloroborane etherates are preferred. Thus diborane can be prepared from $NaBH_4$ and dichloroborane etherate.

We have found that at 25° C. monochloroborane diglymate, for example, rapidly hydrogenates carboxylic acids, nitriles, aldehydes, ketones and lactones. Azo compounds and t-amides are hydrogenated likewise. According to our experience, esters are attacked very slowly while acid chlorides and nitro compounds are completely unaffected by these chloroborane etherates so that it is possible to hydrogenate the foregoing classes of compounds without affecting these groups. Acid amides are not hydrogenated although a salt is formed using two atoms of active hydrogen per mole of the amide.

Solvents may be used for the compounds to be hydrogenated where they are solids or are not soluble in the etherate. Such solvents should, of course be inert under reaction conditions. Likewise, reaction temperatures can not be stated for all hydrogenations; they will vary with the particular reducible compound, the chloroborane etherate, and economic factors.

The following examples are illustrative of the characteristic hydrogenating action of the compounds of this invention:

Example 7
HYDROGENATION OF p-NITROBENZOIC ACID

Monochloroborane (0.6 mole) was prepared in a reaction vessel by placing 0.3 mole sodium borohydride (300 ml., 1.0 M solution in diglyme) in a litre round bottom, 3 necked flask provided with a mechanical stirrer, a separatory funnel, a nitrogen inlet and outlet.

0.3 mole boron trichloride in ethyl ether (100 ml., 3.0 M soln.) were then slowly added with stirring when sodium chloride precipitated and monochloroborane etherate was formed in solution.

0.5 mole of p-nitrobenzoic acid (66.8 g.) ($NO_2C_6H_4COOH$) was dissolved in 200 ml. diglyme and was slowly added from the separatory funnel while vigorous stirring was in progress. The reaction proceeded first with the evolution of hydrogen, followed by a vigorous exothermic reaction. The reaction flask was cooled in running water to maintain the reaction temperature at about 30° C.

The reaction mixture was allowed to stand for an hour to complete the reaction. The contents of the flask were then poured onto crushed ice and hydrochloric acid (HCl), when the nitro alcohol separated as solid. This was separated, washed with ice water and dried. Some of the nitro alcohol was also recovered by extraction with ether of the aqueous layer after filtration. The crude p-nitrobenzyl alcohol, M.P. 91–93° C. was obtained in 89 percent yield. Recrystallization from hot water, after decolorization with active charcoal, gave pure white needles in 72.6 percent yield (M.P. 92–93° C.).

Example 8
HYDROGENATION OF p-CHLOROBENZOIC ACID

In a similar way 0.4 mole of p-chlorobenzoic acid ($ClC_6H_4COOH$) was hydrogenated to the corresponding p-chlorobenzyl alcohol (M.P. 74–75° C.) in 84 percent yield.

Example 9
HYDROGENATION OF BENZONITRILE 0.4 mole of benzonitrile (41.3 g.) ($C_6H_5CN$) dissolved in 100 ml. of diglyme was added slowly and with stirring to 0.8 mole of monochloroborane etherate prepared in the manner described earlier. The reaction vessel was cooled in water to dissipate the heat of reaction. At the end of one hour reaction time at 25 to 30° C., the reaction product was carefully hydrolysed by adding conc. hydrochloric acid till strongly acid. Then the solvent and excess acid were removed under reduced pressure leaving residue of benzylamine hydrochloride and NaCl. The residue was treated with conc. aqueous alkali and the liberated amine was extracted with ether repeatedly, dried and distilled. Benzylamine (B.P. 181–183° at 741 mm.) was obtained in 83 percent yield.

Example 10
HYDROGENATION OF p-TOLUNITRILE

In a similar way, 0.4 mole of p-tolunitrile ($CH_3C_6H_4CN$) was hydrogenated to p-methylbenzylamine in 85 percent yield. Here the amine was isolated in the form of the hydrochloride and purified by recrystallization from hot ethanol (M.P. of the amine hydrochloride 233–234° C.).

Example 11
HYDROGENATION OF ACETOPHENONE

Using a similar procedure 0.4 mole of acetophenone ($CH_3COC_6H_5$) was hydrogenated using 0.4 mole dichloroborane etherate. Phenylmethyl carbinol was isolated in 89 percent yield.

Example 12
HYDROGENATION OF m-NITROBENZALDEHYDE 0.4 mole of m-nitrobenzaldehyde ($NO_2C_6H_4CHO$) was hydrogenated to m-nitrobenzyl alcohol in 85 percent yield, using 0.2 mole of monochloroborane etherate.

Example 13
HYDROGENATION OF GAMMA-BUTYROLACTONE

Using procedures as described above 0.4 mole gamma-butyrolactone

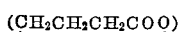

was hydrogenated to the corresponding glycol in 85 percent yield, by the use of monochloroborane etherate as the hydrogenating agent.

We discovered also that the etherates described above react rapidly, and commonly quantitively, with olefins. Normally the reaction occurs at room temperature with liberation of heat, and there is nothing critical in this factor, for temperatures as low as 0° C. can be used as well as elevated temperatures, say 100° C., provided the temperature is not such as to cause undesired decomposition of the reactants or reaction products. Solvents may be used, if need be, such as any of the ethers or inert hydrocarbon solvents such, as for example as n-hexane [$CH_3(CH_2)_4CH_3$] or other paraffinic hydrocarbon solvent. In the case of liquid olefins, no solvent will usually be necessary.

The reaction results in organoboron products that may be recovered in various ways, as by distillation. We find that usually a mixture of organoboron products results, depending upon the reagent used. Thus, when the monochloroboron etherates are used, a major constituent of the reaction product is $ClBR_2$ where R is the saturated radical resulting from the olefin, with smaller amounts of trialkyl boron, etc. On the other hand, when the dichoro etherates are used, the major constituent is $Cl_2BR$. Thus hexene-1, hexene-2, cyclohexene-2,4, 4-trimethyl pentene-1, and alpha methyl styrene have been reacted on a 0.5 M scale with the etherates of this invention, and in each case the total organoboron reaction products were obtained in 80 percent to 95 percent yields.

Other typical olefins which we find to participate in these reactions are: ethylene, propylene, 2-butene, 2-pentene, 3-hexene, 1-heptene, 1-octene, 2-octene, 1-diisobutylene, 2-diisobutylene, trimethyl ethylene, 1-decene, 2-decene, 3-decene, 1-tetradecene, 1-octadecene, cyclopentene, cycloheptene and pinene. The reaction proceeds rapidly to form the corresponding organoboron compound in almost quantitative yields, with the uptake of one hydride hydrogen per mole of olefin.

This aspect of the invention is illustrated by the following examples:

Example 14
PREPARATION OF ClB($C_6H_{11}$)$_2$ FROM BH$_2$Cl AND CYCLOHEXENE The reagent $H_2BCl:O(C_2H_5)_2$ was prepared as described above. In a 500 ml. dry round bottom flask 0.3 mole of the reagent $H_2ClB:OR_2$ in 150 ml. ethyl ether was placed. Maintaining an atmosphere of dry nitrogen, 0.5 mole of cyclohexene

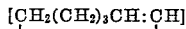

was slowly added from a separatory funnel over a period of 30 minutes while the contents of the flask were magnetically stirred and cooled by water at 25° C. After standing for half an hour at room temperature the flask was warmed on a steam cone for 30 minutes. The solvent was removed and the crude organoboron compound formed recovered by distillation under reduced pressure; the crude organoboron compound obtained (39.9 gm.) on refractionation gave 21.9 gm. pure ClB($C_6H_{11}$)$_2$ (B.P. 112–113° C./1 mm.), 3.09 gm. of tricyclohexyl boron (B.P. 130° C./1 mm.) and some higher boiling boron compound.

Example 15
PREPARATION OF ClB($C_6H_{13}$)$_2$ FROM BH$_2$Cl AND 2-HEXENE In the same way as described above, 0.5 mole 2-hexene [$CH_3CH:CH(CH_2)_2CH_3$] was reacted with 0.3 mole of the reagent $BH_2Cl:O(C_2H_5)_2$ in ethyl ether. The total organoboron obtained in this case was 28.5 gm., and refractionation gave 16.3 gm. of ClB($C_6H_{13}$)$_2$ (B.P. 103–6° C./1 mm.), 6.5 gm. of trihexylboron, and some higher boiling organoborons.

Example 16
REACTION OF Cl$_2$BH : OR$_2$ WITH 1-OCTENE

The reagent, prepared as described earlier, on reacting with 0.5 mole of octene-1 [$CH_3(CH_2)_5CH=CH_2$] employing the procedure described above, gave a crude organoboron product in over 90 percent yield. The mixed organoboranes were separated when the dichloro derivative $Cl_2B(C_8H_{17})$ was found to form over 75 percent of the crude product.

Example 17
REACTION OF MONOCHLOROBORANE WITH ETHYLENE IN TETRAHYDROPYRAN Monochloroborane tetrahydropyranate (0.555 mole) was prepared in a reaction flask by adding 0.185 mole diborane and 0.185 mole boron trichloride to 3.55 moles of tetrahydropyran. Into this solution was bubbled, slowly and under slight pressure, 1.07 moles of ethylene ($C_2H_4$). The reaction was practically complete in 12 hours and the organoboron product was obtained in 83 percent yield based on the ethylene absorbed and 64 percent on the total ethylene passed.

Example 18
REACTION OF DICHLOROBORANE WITH ETHYLENE

Dichloroborane (0.555 mole) and 3.5 mole tetrahydropyran and 0.555 mole ethylene were used as before. The organoboron recovered at the end of 24 hours of reaction at 25° C. was spontaneously flammable in air, which is characteristic of boron triethyl, $B(C_2H_5)_3$.

The compounds produced thus by reaction of these chloroborane etherates and olefins are useful for various purposes. Thus, some are useful as additives to gasoline to improve combustion characteristics, while in the case of long chain olefins the products have detergent properties and corrosion inhibiting characteristics. Or, these organoboranes may be oxidized to the corresponding alcohols. Too, the trialkyl borons react with carboxylic acids, e.g., acetic and p-chlorobenzoic, to give acyl diethyl boronites, and with aldehydes to give boronous esters. And as shown at vol. 56, Chem. Reviews, p. 1054–1055, the products BRCl$_2$ and BR$_2$Cl of reaction between these new etherates and olefins can be converted to a variety of products.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. An etherate having the formula $H_2ClB:A$, where A is an ether selected from the group consisting of tetrahydrofuran, tetrahydropyran, RR'O and RO(C₂H₄O)ₙR, where n is a positive integer and R and R' are lower alkyl.

2. An etherate having the formula $$H_2ClB:RO(C_2H_4O)_nR$$

where R is lower alkyl and n is a positive integer.

3. An etherate having the formula H₂ClB:RR'O where R and R' are lower alkyl.

4. An etherate having the formula HCl₂B:A, where A is an ether selected from the group consisting of tetrahydrofuran, tetrahydropyran, RR'O and RO(C₂H₄O)ₙR, where n is a positive integer and R and R' are lower alkyl.

5. An etherate having the formula $$HCl_2B:RO(C_2H_4O)_nR$$

where R is a lower alkyl and n is a positive integer.

6. An etherate having the formula HCl₂B:RR'O where R and R' are lower alkyl.

7. Monochloroborane tetrahydrofuranate.
8. Monochloroborane tetrahydropyranate.
9. Monochloroborane dimethyl ethylene glycol etherate.
10. Monochloroborane diethyl etherate.
11. Monochloroborane dimethyl etherate.
12. Dichloroborane tetrahydropyranate.
13. Dichloroborane tetrahydrofuranate.
14. Dichloroborane diethyl etherate.

15. That method of making a chloroborane etherate selected from the group consisting of monochloroborane etherate and dichloroborane etherate comprising the step of contacting boron trichloride with a boron-containing compound of the group consisting of diborane and metallic borohydrides in the presence of an ether which is a solvent for said boron-containing compound and which is selected from the group consisting of tetrahydrofuran, tetrahydropyran, RR'O and RO(C₂H₄O)ₙR, where n is a positive integer and R and R' are lower alkyl, in proportions conforming to the equations $$MBH_4 + BCl_3 + 2A \rightarrow MCl + 2H_2ClB:A$$

in the case of metallic borohydride, and $$B_2H_6 + BCl_3 + 3A \rightarrow 3H_2ClB:A$$

in the case of diborane;

$$MBH_4 + 3BCl_3 + 4A \rightarrow 4HCl_2B:A + MCl$$

in the case of metallic borohydrides, and $$B_2H_6 + 4BCl_3 + 6A \rightarrow 6HCl_2B:A$$

in the case of diborane, where M is a metal and A is said ether, and recovering the chloroborane etherate thus formed.

16. That method of making a chloroborane etherate selected from the group consisting of monochloroborane etherate and dichloroborane etherate which comprises contacting boron trichloride and a boron-containing compound of the group consisting of diborane and metallic borohydrides in the presence of an ether selected from the group consisting of tetrahydrofuran, tetrahydropyran, RR'O and RO(C₂H₄O)ₙR, where n is a positive integer and R and R' are lower alkyl, where the molar ratio of said boron trichloride to said metallic borohydrides is at least one to one, said ether being a solvent for said boron-containing compound, and recovering the resulting chloroborane etherate.

17. A method according to claim 18, said borohydride being sodium borohydride.

18. That method of making a chloroborane etherate selected from the group consisting of monochloroborane etherate and dichloroborane etherate which comprises contacting boron trichloride and an alkali metal borohydride in the presence of an ether which is a solvent for said borohydride and which is selected from the group consisting of tetrahydrofuran, tetrahydropyran, RR'O and RO(C₂H₄O)ₙR, where n is a positive integer and R and R' are lower alkyl, said trichloride and said borohydride being present in a molar ratio of at least one to one, and recovering the resulting chloroborane etherate.

19. That method of making a mono-chloroborane etherate which comprises contacting boron trichloride and an alkali metal borohydride in the presence of an ether in which said borohydride is soluble and which is selected from the group consisting of tetrahydrofuran, tetrahydropyran, RR'O and RO(C₂H₄O)ₙR, where n is a positive integer and R and R' are lower alkyl, said trichloride, said borohydride and said ether being present in a molar proportion of 1:1:2, and recovering the resulting mono-chloroborane etherate.

20. A method according to claim 19, said borohydride being sodium borohydride.

21. A method according to claim 19, said borohydride being sodium borohydride and said ether having the formula RO(C₂H₄O)ₙR, where n is a positive integer and R is lower alkyl.

22. That method of making a di-chloroborane etherate which comprises contacting boron trichloride and an alkali metal borohydride in the presence of an ether in which said borohydride is soluble and which is selected from the group consisting of tetrahydrofuran, tetrahydropyran, RR'O and RO(C₂H₄O)ₙR, where n is a positive integer and R and R' are lower alkyl, said trichloride, said borohydride and said ether being present in a molar proportion of 1:3:4, and recovering the resulting di-chloroborane etherate.

23. A method according to claim 22, said borohydride being sodium borohydride.

24. A method according to claim 22, said borohydride being sodium borohydride and said ether having the formula RO(C₂H₄O)ₙR, where n is a positive integer and R is lower alkyl.

25. That method of making a chloroborane etherate selected from the group consisting of monochloroborane etherate and dichloroborane etherate which comprises contacting boron trichloride and diborane in the presence of an ether that is a solvent for diborane and which is selected from the group consisting of tetrahydrofuran, tetrahydropyran, RR'O and RO(C₂H₄O)ₙR, where n is a positive integer and R and R' are lower alkyl and recovering the resulting chloroborane etherate.

References Cited in the file of this patent

UNITED STATES PATENTS

| | | |
|---|---|---|
| 2,247,821 | Ruthruff | July 1, 1941 |
| 2,446,008 | Hurd | July 27, 1948 |
| 2,543,511 | Schlesinger et al. | Feb. 27, 1951 |
| 2,544,472 | Schlesinger et al. | Mar. 6, 1951 |

OTHER REFERENCES

Schlesinger et al.: "Journ. Am. Chem. Soc.," vol. 53, page 4322 (1931).

Wieberg et al.: "Z. Anorganische und Allgemeine Chemie," vol. 202, page 22 (1931).

Nespital: "Z. Physikalische Chemie," vol. 16, pages 166–178 (1932).

Grimley et al.: "Journ. Chem. Soc.," Part II, pages 1212–1215 (1954).

Rice et al.: J.A.C.S., 77, pages 2750–1 (1955).

Brown et al.: "Journ. Inorg. Nucl. Chem.," vol. 9, pages 51–55 (1959).